(12) United States Patent
Brennom

(10) Patent No.: US 12,102,994 B2
(45) Date of Patent: Oct. 1, 2024

(54) METHOD AND APPARATUS FOR LOADING CATALYST

(71) Applicant: Cat Tech International, Ltd., Scunthorpe (GB)

(72) Inventor: Stephen Brennom, Tampa, FL (US)

(73) Assignee: CAT TECH INTERNATIONAL, LTD., Scunthorpe (GB)

(*) Notice: Subject to any disclaimer, the term of this patent is extended or adjusted under 35 U.S.C. 154(b) by 298 days.

(21) Appl. No.: 17/630,819

(22) PCT Filed: Jul. 31, 2020

(86) PCT No.: PCT/IB2020/057238
§ 371 (c)(1),
(2) Date: Jan. 27, 2022

(87) PCT Pub. No.: WO2021/019502
PCT Pub. Date: Feb. 4, 2021

(65) Prior Publication Data
US 2022/0274078 A1 Sep. 1, 2022

Related U.S. Application Data

(60) Provisional application No. 62/881,179, filed on Jul. 31, 2019.

(51) Int. Cl.
*B01J 8/00* (2006.01)
*B01J 8/06* (2006.01)

(52) U.S. Cl.
CPC ............. *B01J 8/003* (2013.01); *B01J 8/06* (2013.01); *B01J 2208/00752* (2013.01); *B01J 2208/00778* (2013.01)

(58) Field of Classification Search
CPC .... B01J 8/003; B01J 8/06; B01J 2208/00752; B01J 2208/00778; B01J 8/0015; B65G 69/16
(Continued)

(56) References Cited

U.S. PATENT DOCUMENTS 3,608,751 A * 9/1971 Hundtofte .............. B65G 69/16
414/800
7,753,086 B2 * 7/2010 Dessen ................ B65G 11/206
422/219

(Continued)

FOREIGN PATENT DOCUMENTS

WO 2017129689 A1 8/2017

OTHER PUBLICATIONS

Search Report and Written Opinion in related application SG 11202200741P dated Apr. 17, 2023.
(Continued)

*Primary Examiner* — Timothy L Maust
*Assistant Examiner* — Christopher M Afful
(74) *Attorney, Agent, or Firm* — Patterson + Sheridan, LLP

(57) ABSTRACT

According to embodiments, an apparatus for distributing solid particles into a tube includes a center member and a plurality of damper members connected to the center member. Each damper member includes a loop extending away from the center member. Each loop is arranged on the center member extending from a first position on the center member to a second position on the center member different from the first position in a longitudinal direction of the center member.

18 Claims, 3 Drawing Sheets

(58) Field of Classification Search
USPC .............................................................. 141/1
See application file for complete search history.

(56) References Cited

U.S. PATENT DOCUMENTS

| | | | |
|---|---|---|---|
| 10,279,330 B2* | 5/2019 | McNaughton | B01J 8/003 |
| 10,821,410 B2* | 11/2020 | Cota | B01J 8/06 |
| 2007/0084519 A1* | 4/2007 | Brennom | B01J 8/0015 |
| | | | 141/2 |
| 2007/0215236 A1* | 9/2007 | Brennom | B01J 8/003 |
| | | | 141/18 |
| 2008/0298932 A1 | 12/2008 | Fry | |
| 2019/0030505 A1 | 1/2019 | Cota | |

OTHER PUBLICATIONS

International Search Report and Written Opinion in related application PCT/IB2020/057238 dated Feb. 4, 2021.

* cited by examiner

METHOD AND APPARATUS FOR LOADING CATALYST

BACKGROUND OF THE INVENTION

Field of the Invention

Embodiments of the present invention generally relate to methods and apparatus for filling particulate material into a tube. More particularly embodiments of the present invention generally relate to methods and apparatus for filling a catalyst into a tube of, for example, a primary reformer furnace or a tubular reactor.

Description of the Related Art

Primary reformer furnaces such as those used in the production of ammonia, hydrogen and methanol typically utilize tens or hundreds of heat transfer tubes that are filled with catalyst particles. Similarly, tubular reactors such as those used in the production of ethylene oxide typically utilize thousands of tubes that are filled with catalyst particles. While primary reformer furnaces and tubular reactors are somewhat different in terms of, for example, tube count, tube diameter, and average catalyst particle size, they are also similar in that the tubes must initially be filled with catalyst, and used catalyst must be replaced with fresh catalyst periodically. Excessive and unevenly-distributed voids between individual particles in the catalyst fill can easily form if catalyst particles are introduced to the tubes too quickly or non-uniformly during the filling of the tubes. Also, catalyst particles can fracture or crush if they are allowed to free-fall too far during filling of the tubes. Excessive voids or crushed catalyst create local density variations as well as an average catalyst density in a fully loaded tube that is less than optimal. Local density variations that differ significantly from tube to tube cause variations in the pressure drops across individual tubes. This can result in distortions of gas distribution in a multi-tube reactor and cause unwanted temperature distribution variations within individual tubes during operation of the furnace. The resultant thermal and mechanical stress in the tube can reduce its useful life. To reduce excessive voids, the tube can be vibrated by such methods as tapping or vibrating the upper part of the tube. However, this is laborious, delays the filling operation and still may not achieve a desirable average loaded density in a tube. Additionally, tapping or vibration can expose the tube to extra mechanical stress. If excessive crushing or fracturing of catalyst particles occurs during filling, the only remedy is to remove all catalyst from the tube and refill it properly. This adds substantial labor and results in the loss of expensive catalyst.

One method for reducing density variations utilizes a short sock or sock-like member made of a material such as a soft plastic that is first filled with the catalyst. The catalyst can be delivered from the manufacturer already in the socks. When filling the tubes, a sock filled with catalyst is fastened onto a line and lowered towards the bottom of each tube. By jerking the line, the sock opens at its bottom and the catalyst flows into the tube with a minimum of free fall. However, there are several disadvantages with this method. Filling one tube with this method usually requires a number of the socks thereby making the method laborious. Sometimes, the sock will open prematurely, allowing the catalyst particles to fall a great distance and achieve enough gravimetrically induced velocity to crush or fracture when they hit the bottom of a tube. If the sock contains voids among the particles of catalyst, then corresponding voids will typically form in the tube when the sock is emptied. Consequently, the tubes must be exposed to tapping or vibrating to secure reasonably even gas distribution over the tubes.

Another method for attaining good and even packing of catalyst into a tube includes filling the tube with water and then pouring in the catalyst. However, this method requires that the water subsequently be completely removed. Removal of the water and necessary subsequent drying takes a long time. Additionally, used water requires special treatment, adding time and cost.

RD Patent Application RD-253040-A describes a method for filling a tube with a catalyst by adding the catalyst to the upper part of the tube by means of a transporter comprising a slowly rotating arrangement. The catalyst is transported from a container through a duct in which there is a rod with oblique/transverse propeller wings or brushes. The catalyst particles are then transported to the upper end of the catalyst tube and fall smoothly into the tube. However, the particles must be added slowly in order to get even filling of the tube. Further, the catalyst drops a significant length especially during the first part of the filling operation thereby permitting the catalyst to be crushed or broken during the fall. Therefore, the particles can pack unevenly over the vertical length of the tube and the filling time can be long.

U.S. Pat. No. 5,247,970 describes a method for filing a tube with catalyst using a line provided with substantially transverse damper means, each having a radial extension smaller than the inner radius of the tube. However, the damper members generally have a fixed radius. Thus, each loading tool is suitable only for loading a tube having a certain diameter.

In addition, U.S. Pat. No. 7,770,613 describes methods and apparatus for filling a tube with a catalyst by using a loading tool having a center member with a plurality of damper members, each damper member formed into a loop that extends radially away from the center member. The type and shape of the damper members and center member can be selected based on the actual type of catalyst particles and tube diameter. However, the loop of each damper member has generally a fixed diameter and shape and is in a fixed plane perpendicular to the center member.

Therefore, there exists a need for a catalyst loading tool that is cost effective and simple to manufacture, and is easily and flexibly configurable to accommodate a wide range of catalyst sizes and shapes and tube diameters and lengths for a given reactor.

SUMMARY OF THE INVENTION

According to embodiments, an apparatus for distributing solid particles into a tube includes a center member and a plurality of damper members connected to the center member. Each damper member includes a loop extending away from the center member. Each loop is arranged on the center member extending from a first position on the center member to a second position on the center member different from the first position in a longitudinal direction of the center member.

According to further embodiments, an apparatus for distributing solid particles into a tube includes a center member and plurality of damper members connected to the center member. Each damper member includes a plurality of loops extending away from the center member. Each loop is arranged on the center member extending from a first position on the center member to a second position on the center member different from the first position in a longitudinal direction of the center member.

According to further embodiments, method for distributing solid particles into a tube is disclosed. The method includes configuring a loading tool to include a plurality of damper members connected to a center member, wherein each damper member includes at least one loop, and each loop is arranged on the center member extending from a first position on the center member to a second position on the center member different from the first position in a longitudinal direction of the center member. The method further includes positioning the loading tool in an interior of the tube. The method further includes filling the tube with the solid particles, wherein the solid particles contact the plurality of damper members. The method further includes removing the loading tool from the tube as the solid particles fill the tube.

Embodiments of the present invention generally relate to methods and apparatus that prevent breakage of a catalyst particle and evenly fill the catalyst into tubes to an optimum density. Particles of catalyst can empty directly down into the tubes in order to obtain quick filling of the tubes. However, a loading tool softens the fall of the catalyst and provides even filling of the tube in order to avoid crushing or breaking of the catalyst and the formation of catalyst voids in the tube. The loading tool comprises a center member, such as a rope, a wire, a rod or a chain, or the like, with a plurality of damper members. Each damper member is shaped by connecting an upper element to a lower element by a firmly-secured and impact-resistant strand. The upper element and lower element are both attached to the center member by an attachment loop. The upper element is attached to the center member at a position above a position where the lower element is attached to the center portion. An elongated portion of the lower element is connected to the upper element to form a loop extending from the lower element to the upper element. That is, each damper member extends between two different height positions along the center member. The damper member has a radial extension from the center member that is smaller than the inner radius of the tube. The shape, radial extension and height of each damper member can be adjusted by moving the relative distance between the attachment loops along the center member, and by rotating the attachment loops relative to one another.

In a catalyst filling operation, the center member can be jerked during the filling operation while simultaneously being lifted up gradually as the tube fills. Alternatively, the center member can remain stationary with its lowest extremity slightly above the anticipated fill level of the catalyst being added. In either type of operation, limited, predetermined amounts of catalyst are introduced sequentially to allow periodic adjustment of the position of the lowest extremity of the center member. The damper members reduce the average falling velocity of the catalyst and divert the catalyst from falling in straight downward paths while avoiding bridge formation of the catalyst particles during filling. The shape of the damper member and center member can be adapted in particular cases to the actual type of catalyst particles and the tube diameter. The damper members can be stiff or flexible since they do not occupy a substantial portion of the cross section of the tube at any particular axial location. The height of the lowest damper member of the center member can be periodically adjusted manually by physically feeling the center member change from tension to slackness as the lowest damper member of the center member contacts the catalyst interface.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
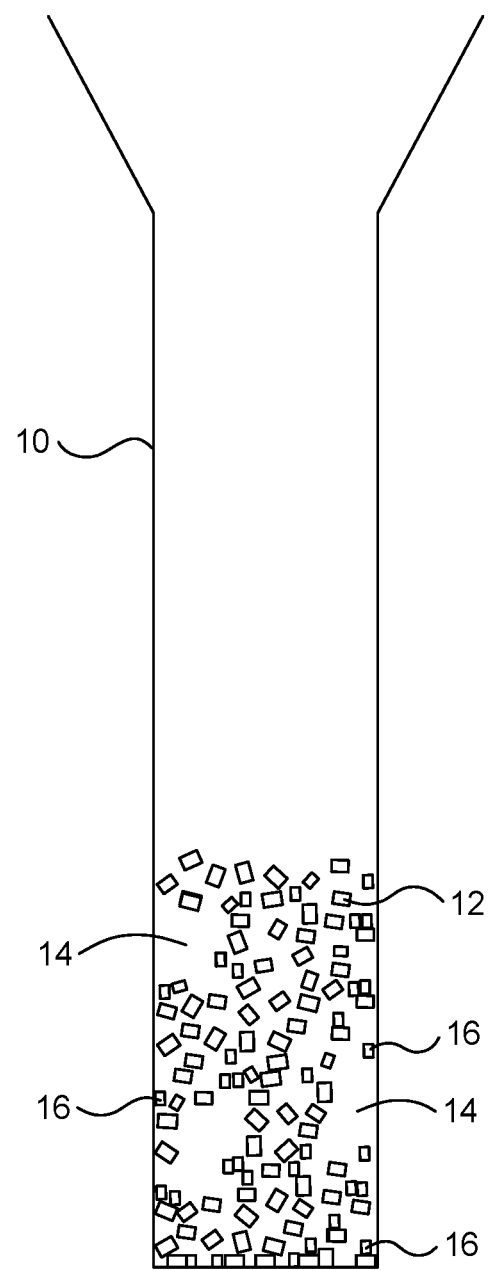
FIG. 1 is a schematic view showing a tube filled in a conventional manner.

FIG. 1 shows a tube 10 such as a catalyst tube of a reactor. As illustrated, filling the tube 10 by allowing the particles 12 to fall directly down the tube produces voids 14 and broken particles 16.

Figure 2:
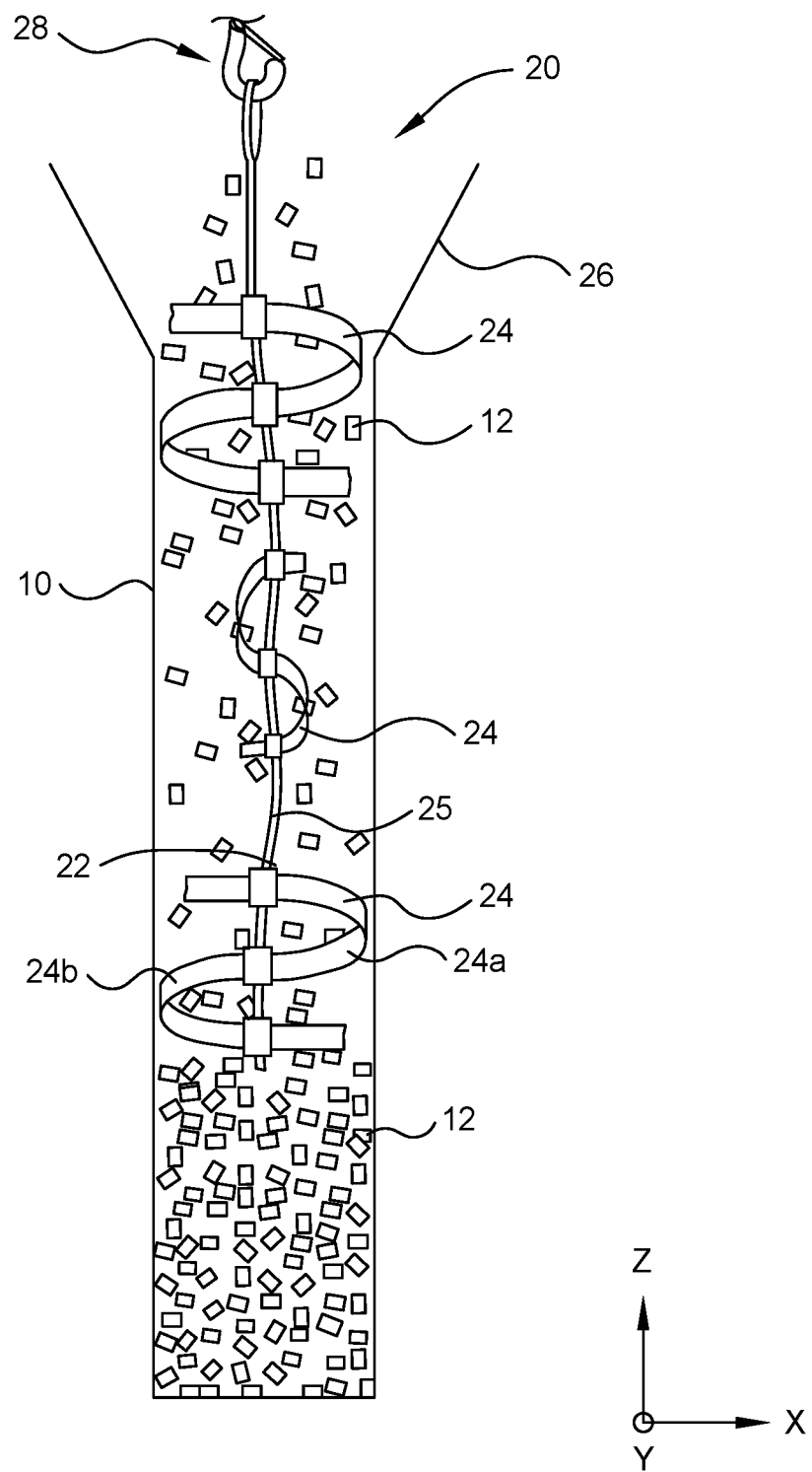
FIG. 2 is a schematic view showing a tube filled in accordance with an embodiment of the invention.

FIG. 2 shows particles 12 such as catalyst falling into a tube 10 that includes a loading tool 20. The loading tool 20 comprises a center member 22 such as a wire, a chain, a rod, or the like and a plurality of damper members 24 axially arranged on the center member 22 to provide substantially circumferential coverage along a longitudinal length of the tube 10. The center member 22 can be stiff or flexible. The distance between adjacent damper members 24 on the center member 22 can be substantially equal or can vary. The distance between the upper and lower elements of the damper members—i.e., the length in the longitudinal or Z direction—can be substantially equal or vary, and the relative rotational position between the upper and lower elements of the damper members along an axis of the center member (indicated by the Z direction) can be substantially the same or vary. The plurality of damper members 24 reduces the average falling velocity of the particles 12 and diverts the particles from falling in straight downward paths.

Since the damper members 24 do not occupy a substantial portion of the cross section of the tube 10 at any particular axial location, the damper members 24 can be stiff or flexible and still permit the particles 12 to fall. The loading tool 20 can be moved or jerked primarily in both directions axially and is pulled gradually out of the tube 10 as the tube is filled, or it can remain stationary while catalyst is being added and then pulled upwards in the tube between catalyst filling sequences. As the loading tool 20 is removed from the tube 10, it can be supported by different sections at a coupling 28 such as an eyelet and mating shackle that can be positioned within the center member 22. Therefore, the amount of the loading tool 20 that has to be handled outside of the tube 10 is limited to the length between couplings 28 on the center member 22. The particles 12 can be poured down into the tube 10 through a funnel 26 that is removed after filling is completed. However, the particles 12 can also be added to the tube through other methods known in the art.

Figure 3:
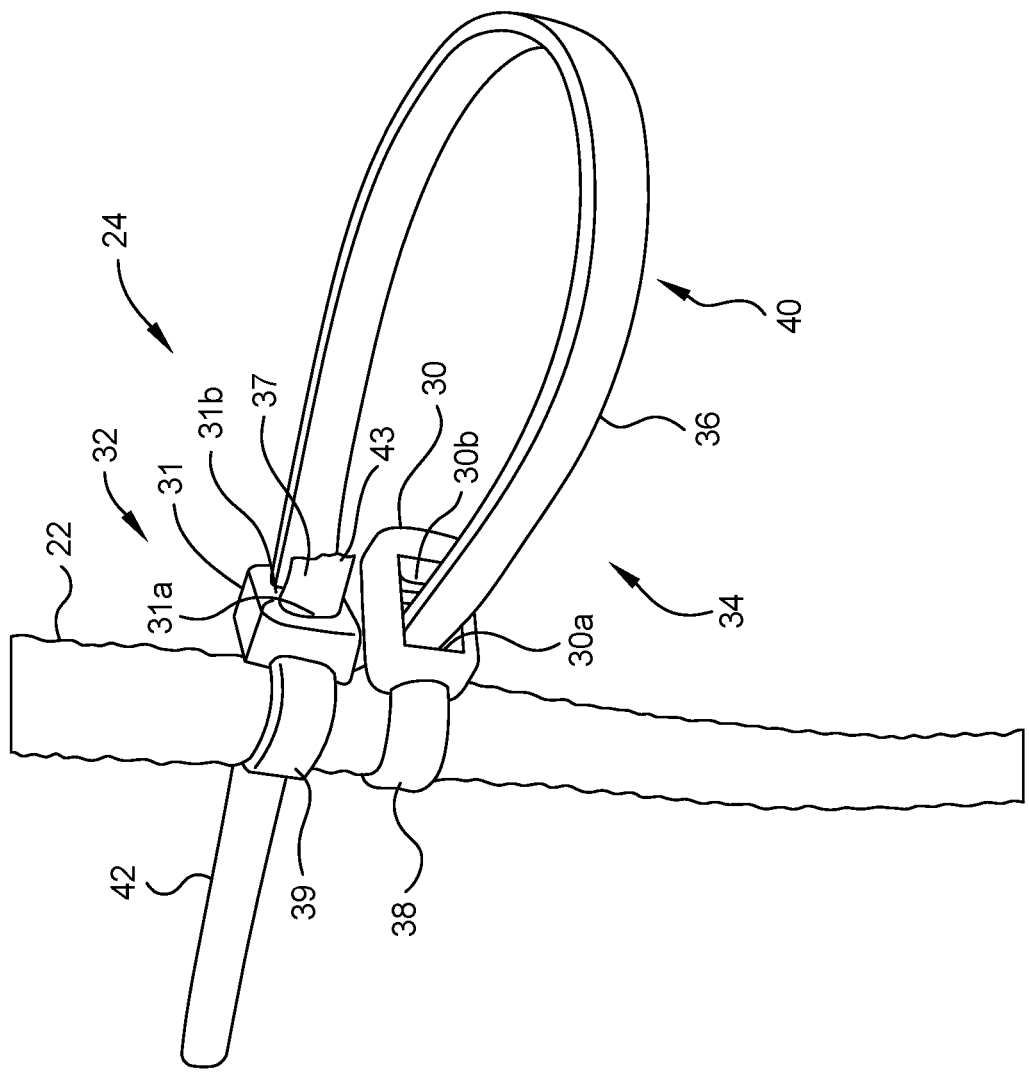
FIG. 3 is a perspective view of a damper member attached to a center member in accordance with an embodiment of the invention.

FIG. 3 illustrates an embodiment for the damper member 24. In FIG. 3, a single-loop damper member 24 is shown. However, as described in further detail below and as shown in FIG. 2, the loading tool 20 may also include multiple-loop damper members 24. The multiple-loop damper members 24 may have two consecutive loops as shown in FIG. 2. The multiple-loop damper members 24 may have more than two consecutive loops. For example, the multiple-loop damper members 24 may have three, four, or five (or even more) consecutive loops. Damper members 24 with any number of loops may formed on the loading tool 20.

Catalyst that is loaded into a tube of a primary reformer furnace typically has a relatively large average diameter and therefore, single-loop damper members 24 arranged at intervals may be sufficient to sufficiently reduce the average falling velocity of the particles 12. Thus, for example, when used for loading catalyst into a tube of a primary reformer furnace, the loading tool 20 may include a plurality of single-loop damper members 24, with consecutive single-loop damper members 24 being spaced apart from one another along the length of center member 22 at predetermined intervals along center member 22.

Conversely, catalyst that is loaded into a tube of a tubular reactor typically has a relatively small average diameter and therefore, multiple-loop damper members 24 arranged at intervals may be required to sufficiently reduce the average falling velocity of the particles 12. Thus, for example, when loading catalyst into a tube of a tubular reactor, the loading tool 20 may include a plurality of multiple-loop damper members 24, with consecutive multiple-loop damper members 24 being spaced apart from one another along the length of center member 22 at predetermined distances.

An example of a loading tool 20 having a single-loop damper member 24 is shown in FIG. 3. As shown in FIG. 3, each loop of damper member 24 is comprised of an upper element 32 and a lower element 34. The elements 32, 34 may be inexpensive and easily adjustable commercially available fasteners. The elements 32, 34 each have a locking portion 31, 30, respectively. The locking portion 30 includes a first lock opening 30a and a second lock opening 30b. The locking portion 31 includes a first lock opening 31a and a second lock opening 31b. The lower element 34 includes an elongated portion 36 that extends from the locking portion 30. The elongated portion 36 extends from the locking portion 30 around the center member 22 and through first lock opening 30a, forming a small attachment loop 38 that secures the lower element 34 to the center member 22. In order to secure the lower element 34 to the center member 22, the attachment loop 38 has a diameter approximately equal to an outer diameter of the center member 22. The elongated portion 36 extends from first lock opening 30a into second lock opening 31b in the locking portion 31 of the upper element 32, forming a damper loop 40. In other words, the damper loop 40 extends from the locking portion 30 of the lower element 34 at a first position on the center member 22 to the locking portion 31 of the upper element 32 at a second position on the center member 22 higher on the center member than the first position in the Z direction. The elongated portion 36 extends through the second lock opening 31b. On the other side of the second lock opening 31b, the elongated portion 36 terminates at an end portion 42.

The upper element 32 includes an elongated portion 37 that extends from locking portion 31. The elongated portion 37 extends around the center member 22 and through first lock opening 31a, forming a small attachment loop 39 that secures the upper element 32 to the center member 22. In order to secure the upper element 32 to the center member 22, the attachment loop 39 has a diameter approximately equal to an outer diameter of the center member 22.

As shown in FIG. 3, the elongated portion 37 ends at end portion 43, so that a single-loop damper element 24 is formed. That is, the two elements 32, 34 are used to form a single-loop damper element 24. Alternatively, the elongated portion 37 can extend to another lock opening of a third element (not shown in FIG. 3) positioned above upper element 32, forming another loop on damper element 24. That is, as shown in FIG. 2, a damper element 24 of tool 20 may include consecutive loops 24a, 24b. Such consecutive loops 24a, 26b may comprise one multiple-loop damper element 24. Further, there may be a gap 25 along center member 22 where no damper element 24 is present.

Generally, n+1 elements are used to form n loops for a damper element 24. In other words, the two elements 32, 34 are used to form the single-loop damper element 24 shown in FIG. 3, and three elements are used to form each two-loop damper element 24 shown in FIG. 2. Thus, any number of elements such as upper element 32 and lower element 34 may be used to form a damper member 24 with a desired number of consecutive loops, and/or with a gap between damper members 24, to account for various factors such as, for example, tube diameter, catalyst size, catalyst weight, and the catalyst's resistance to breaking.

Additionally, each damper member 24 extends in the Z direction indicated in FIG. 2. The distance between the locking portions 30, 31 along center member 22 can be adjusted, which, in turn, changes a distance that the damper member 24 extends in the X and Y directions.

Further, as shown in FIG. 2, the lower pair of damper members 24a, 24b (and the upper pair of damper members) are substantially oriented in the X-Z plane, and the middle pair of damper members are substantially oriented in the Y-Z plane. Typically, all damper members 24 are collectively arranged to provide substantial coverage in the X-Y plane. Alternatively, the orientation of locking portions 30, 31 relative to one another can be rotationally adjusted, which changes the shape and coverage area of the damper member 24 in the X-Y plane as well as the distance that the damper member 24 extends in the X and Y directions. Thus, any number of desired arrangements of the damper members 24 can be achieved for a desired coverage in the X-Y plane and as well as distance in the X and Y directions (i.e., radially toward the inner wall of the tube). Accordingly, the loading tool 20 can be configured to sufficiently reduce the average falling velocity of catalyst particles for a wide variety of tube sizes, catalyst particle average diameters, and/or catalyst characteristics.

The locking portion 30 and elongated portion 32 of the damper member 24 can be made of a metal or plastic with varying degrees of stiffness. Shaping of the damper member 24 and changes to length, stiffness, number, length that the damper member 24 extends in the Z direction, axial spacing on the center member 22, etc., can be adapted to the material to be filled into the tube 10 and the size of the tube 10. These changes can be accomplished since the damper member 24 is cheap and can be adjusted easily.

As a catalyst loading operation progresses, periodic adjustments of the height of the lowest extremity of the center member can be made manually. This is accomplished by physically feeling the center member change from tension to slackness as the lowest extremity of the center member contacts the catalyst interface, similar to the sensation from a weighted fishing line contacting the bottom of a body of water.

With embodiments of the present invention, a novel, reproducible, and quick filling method is disclosed, including configuring the loading tool 20 as described above, and then filling one or more tubes with catalyst using the loading tool 20 so configured. The method is gentle to the particles such that crushing of catalyst particles during the filling operation is avoided. An even filling of the tube is also obtained, and thus one result has been avoidance of uneven temperature distribution when a tube filled with catalyst is in operation. Further, an even density of particles in the tubes is attained without exposing them to tapping/vibration, which is both time-consuming and damaging to the tubes. Consequently, time is saved during filling and also since the tubes do not have to be tapped. The method is simple, cost efficient, and can be modified both quickly and easily. Furthermore, errors connected with filling of particles into socks are avoided. A substantial degree of freedom regarding packaging and the form of transport for the particles also is obtained.

While the foregoing is directed to embodiments of the present invention, other and further embodiments of the invention may be devised without departing from the basic scope thereof, and the scope thereof is determined by the claims that follow.

The invention claimed is:

1. An apparatus for distributing solid particles into a tube, comprising:
 a center member; and
 a plurality of damper members connected to the center member, wherein:
  each damper member includes a loop extending away from the center member,
  each loop is arranged on the center member extending from a first position on the center member to a second position on the center member different from the first position in a longitudinal direction of the center member,
  each damper member is formed from a number of separate elements equal to n+1, where n is the number of loops in the damper member, and
  each element includes:
   a locking portion having a first lock opening and a second lock opening, and
   an elongated portion.

2. The apparatus according to claim 1, wherein the elongated portion of a first element extends through the first lock opening of the first element and into the second lock opening of a second element.

3. The apparatus according to claim 2, wherein the elongated portion of the first element extends from the locking portion and through the first lock opening to form an attachment loop around the center member.

4. The apparatus according to claim 3, wherein the orientation of each damper member can be rotationally adjusted relative to one another to provide a coverage area in the tube to reduce an average falling velocity of the solid particles in the tube to a desired magnitude.

5. The apparatus according to claim 1, wherein each damper member is spaced apart from an adjacent damper member at a predetermined distance in the longitudinal direction of the center member.

6. The apparatus according to claim 1, wherein each damper member is secured to the center member with an attachment loop.

7. An apparatus for distributing solid particles into a tube, comprising:
 a center member; and
 a plurality of damper members connected to the center member, wherein:
  each damper member includes a plurality of loops extending away from the center member,
  the plurality of loops includes a first loop arranged on the center member extending from a first position on the center member to a second position on the center member and a second loop arranged on the center member extending from the second position to a third position on the center member, wherein the first position, the second position, and the third position are different positions in a longitudinal direction of the center member.

8. The apparatus according to claim 7, wherein:
 a lower segment of the first loop is attached to the center member at a same position in the longitudinal direction as an upper segment of the second loop.

9. The apparatus according to claim 7, wherein each damper member is formed from a number of separate elements equal to n+1, where n is the number of loops in the damper member.

10. The apparatus according to claim 9, wherein each element includes:
 a locking portion having a first lock opening and a second lock opening, and
 an elongated portion.

11. The apparatus according to claim 10, wherein the elongated portion of a first element extends through the first lock opening of the first element and into the second lock opening of a second element.

12. The apparatus according to claim 11, wherein the elongated portion of the first element extends from the locking portion and through the first lock opening to form an attachment loop around the center member.

13. The apparatus according to claim 12, wherein the orientation of each damper member can be rotationally adjusted relative to one another to provide a coverage area in the tube to reduce an average falling velocity of the solid particles in the tube to a desired magnitude.

14. The apparatus according to claim 13, wherein each damper member is spaced apart from an adjacent damper member at a predetermined distance in the longitudinal direction of the center member.

15. The apparatus according to claim 7, wherein each damper member is secured to the center member with an attachment loop.

16. A method for distributing solid particles into a tube, comprising:
 configuring a loading tool to include a plurality of damper members connected to a center member, wherein each damper member includes at least one loop, and at least one damper member includes:
  a first loop arranged on the center member extending from a first position on the center member to a second position on the center member, and
  a second loop arranged on the center member extending from the second position to a third position on the center member, wherein the first position, the second position, and the third position are different positions in a longitudinal direction of the center member;
 positioning the loading tool in an interior of the tube;
 filling the tube with the solid particles, wherein the solid particles contact the plurality of damper members; and
 removing the loading tool from the tube as the solid particles fill the tube.

17. The method according to claim 16, wherein the orientation of each damper member is rotationally adjusted relative to one another to provide a coverage area in the tube to reduce an average falling velocity of the solid particles in the tube to a desired magnitude.

18. The method according to claim 16, wherein:
- each damper member is formed from a number of separate elements equal to n+1, where n is the number of loops in the damper member,
- each element includes a locking portion having a first lock opening and a second lock opening, and an elongated portion, and
- configuring the loading tool includes:
    - extending the elongated portion of a first element from the locking portion through the first lock opening to form an attachment loop around the center member, and
    - extending the elongated portion of the first element from the first lock opening and into the second lock opening of a second element to form a loop.

* * * * *